United States Patent Office 3,532,788
Patented Oct. 6, 1970

3,532,788
SUNSCREEN COMPOSITIONS
Charles John Della Lana, Middlesex, Philip A. Ouellette, Rahway, N.J., assignors to Colgate-Palmolive Company, New York, N.Y., a corporation of Delaware
No Drawing. Filed Jan. 18, 1966, Ser. No. 521,433
Int. Cl. A61k 9/06; A61l 23/00
U.S. Cl. 424—59                                                    3 Claims

ABSTRACT OF THE DISCLOSURE

A stable, non-toxic sunscreening composition having a high absorption of ultraviolet rays and capable of depositing a durable and continuous film on the skin. The stable sunscreening composition containing a suitable cosmetic vehicle having dispersed therein a fluorescent concentrate recovered from naturally pigmented petroleum by column chromatography.

---

This invention relates to novel compositions particularly effective in filtering ultraviolet irradiation and providing superior protection against sunburn.

Although the prior art discloses many lotions and creams effective as a protection against excessive sunburn, said formulations possess myriad shortcomings and consequently prove ineffective as satisfactory sunscreening compositions. Compounds such as benzyl cinnamate, benzyl salicylate, menthyl salicylate, aesculatine, quinine salts, hydroquinone etc., have been used in sunscreening compositions to filter or absorb ultraviolet rays but have been found to be totally ineffective in concentrations below 10%. The higher concentrations required for adequate protection have been found to be toxic to the skin. Consequently, para-amino benzoic acid and the alkali salts thereof have been utilized because of thir non-toxic nature. However, these substances have been found to be unstable in the presence of light with the formation of precipitates and therefore ineffective as a protection against sunburn. Ethyl, propyl and butyl esters of para-amino benzoic acids have also been utilized in sunscreening compositions, but have the dual disadvantage of both anesthetizing the nerve endings in the skin and crystallizing thereon rather than retaining its applicable film structure. Thus it is apparent that the essential requirements of a satisfactory sunscreening composition have not been met by the prior art formulations.

The specialized properties of an active agent for preventing sunburn are many. The most essential property is a high absorption of ultraviolet light so that only small concentrations of said agent need be utilized. In addition, said substance must be stable, non-toxic, non-standing to the skin and garments worn by user, and be capable of forming a continuous and tenacious film on the skin so that said film is not readily washed off during swimming.

Accordingly, it has been discovered that a superior sunscreening composition having all of the desirable attributes aforementioned such as high absorption of ultraviolet rays, stability, non-toxicity, non-staining, continuous film formation and strong adherence to the skin to afford lasting protection, can be made by incorporating into a suitable cosmetic vehicle the fluorescent fraction recovered from naturally pigmented petrolatum.

Accordingly, a primary object of the present invention is to provide a non-toxic, non-irritating sunscreening composition.

Another object of the invention is to provide a light stable composition having a high absorption of ultraviolet irradiation.

Still another object of this invention is to provide a sunscreening composition capable of forming a durable, continuous film on the skin.

Another object of this invention is to provide a method of recovering the active sunscreening agent from naturally pigmented petrolatum.

More specifically, the present invention relates to a stable, non-toxic sunscreening composition having a high absorption of ultraviolet rays and capable of depositing a durable and continuous film on the skin comprising a vehicle having dispersed therein at least 5%, and up to 20% of the fluorescent concentrate recovered from naturally pigmented petrolatum.

Naturally pigmented petrolatum is a product of the refining process of crude oil obtained from the high boiling point fraction, which upon distillation yields a heavy residue. This residue, after dewaxing, purification and filtration, yields petrolatum, either dark green, red, amber, yellow or white depending on the degree of decolorization. All the aforesaid pigmented petrolatums exhibit fluorescence when viewed with a Wood's lamp, the degree or intensity of fluorescence varying for each color. The dark green petrolatum exhibits the greatest amount of fluorescence, the red a little less, the amber progressively less and the yellow the least amount of fluorescence. The white petrolatum is non-fluorescent. It has been found that the more intense the fluorescence, the greater the protection against ultra-violet irradiation. Consequently, the best source of the fluorescent fraction is either the dark green or the red petrolatum, due to their greater fluorescence. However, the amber and yellow petrolatums would also yield fluorescent fraction but in smaller amounts.

The fluorescent fraction in said pigmented petrolatum is separated from the non-fluorescent petrolatum by column chromatography. Successive washes with petroleum ether removes the non-fluorescent portions of the petrolatum which represents more than half of the sample (about 80% of red veterinary petrolatum). The fluorescent fraction is collected by repeated additions of chloroform and/or a petroleum ether-chloroform mixture in ratios of 9:1 to 1:1.

The preferred method utilized to isolate the fluorescent fraction of naturally pigmented petrolatum is column chromatography which comprises packing a chromotography column with a slurry of alumina and petroleum ether, dissolving a known quantity of said pigmented petrolatum in petroleum ether and adding this solution to said column, extracting with successive washes of petroleum ether to remove the non-fluorescent portion, follower by successive washes with mixtures of petroleum ether and chloroform and/or chloroform, collecting the fluorescent portion represented by the yellow band area at the bottom of the column, evaporating said solution to dryness by suitable means such as a steam bath. The residue is a waxy and/or tacky product.

The following specific examples are illustrative of the column chromatography method utilized in isolating the fluorescent fraction of naturally pigmented petrolatum.

EXAMPLE I

A slurry of alumina and petroleum ether is packed tightly into a chromatograph column. 1.0544 grams red vet petrolatum is dissolved in petroleum ether and poured into the column. The sides of the column are rinsed with petroleum ether. Rubber tubing is attached to the tube with a clamp to adjust the flow of the extractions which are collected in 100 ml. graduates, poured off into beakers and evaporated to dryness on a steam bath. The bands of fluorescence are followed with Wood's lamp and the solvents are changed after all the extraneous materials are removed.

| Extracting solvent | Time | Weight and color of residue |
|---|---|---|
| 1. 100 ml. petroleum ether | 2 hours | 0.7845 gms.—white—nonfluorescent. |
| 2. 100 ml. petroleum ether | 1 hr. 40 min. | 0.0535 gms.—white—nonfluorescent. |
| 3. 100 ml. petroleum ether | 1 hr. 35 min. | 0.0145 gms.—white—nonfluorescent. |
| 4. 42 ml. petroleum ether | | 0.0097 gms.—white—nonfluorescent. |
| 5. 53 ml. chloroform | 50 minutes | 0.1410 gms.—fluorescent |
| 6. 81 ml. chloroform | 1 hr. 15 min. | Fluorescent. |

The fluorescent band portion, which is about ¼ inch from the bottom of the column is collected, evaporated and the residue is recovered.

EXAMPLE II

The fluorescent fraction is recovered from 1.1835 grams red vet petrolatum utilizing the same apparatus and procedures as in Example I, except that the following extraction steps are followed:

(1) 100 ml. redistilled petroleum ether for 2 hours yields 0.9005 gms. non-fluorescent residue.

(2) 100 ml. redistilled petroleum ether for 1½ hours yields 0.0614 gms. non-fluorescent residue.

(3) 11 ml. of 8:2 petroleum ether:chloroform mixture for 15 minutes results in a wide fluorescent band which moves down to within ¼ inch from the bottom of the column.

(4) 429 ml. of 8:2 petroleum ether:chloroform solution. The fluorescent material up to the top portion of the yellow band is collected and yields 0.2253 gms. fluorescent residue upon evaporation.

(5) 70 ml. of 8:2 petroleum ether-chloroform solution, and collected the yellow band area which yields 0.0108 gms. fluorescent residue upon evaporation.

EXAMPLE III

The apparatus and procedures of Example I are utilized to recover the fluorescent fraction from 1.0596 red vet petrolatum, with the exception that the following extraction steps are followed:

(1) 100 ml. petroleum ether for 1 hour 40 minutes yields 0.7715 gms. non-fluorescent residue.

(2) 100 ml. petroleum ether for 1 hour 30 minutes yields 0.1273 gms. non-fluorescent residue.

(3) 365 ml. 8:2 petroleum ether-chloroform mixture, collected the fluorescent portion till the yellow band which is ¼ inch from bottom of the column, which yields 0.1880 gms. fluorescent residue.

(4) 8:2 petroleum ether-chloroform, collected top portion of yellow band, which yields 0.0128 gms. fluorescent residue.

EXAMPLE IV

The same method is used to recover the fluorescent fraction from 1.3704 gms. red vet petrolatum as in Example I except that the following extraction steps are used:

| Solvent | Residue |
|---|---|
| 1. 100 ml. petroleum ether | 1.0346 gms. nonfluorescent. |
| 2. 100 ml. petroleum ether | 0.1823 gms. nonfluorescent. |
| 3. 100 ml. 8:2 petroleum ether:chloroform | 0.1950 fluorescent. |
| 4. 100 ml. 1:1 petroleum ether:chloroform | 0.410 fluorescent. |
| 5. 94. ml. 1:1 petroleum ether:chloroform | 0.0187 fluorescent. |
| 6. 100 ml. chloroform | 0.0033 slightly fluorescent. |

EXAMPLE V

The method of Example IV is repeated except that an extraction step with a mixture of 9:1 petroleum ether: chloroform is inserted between steps 2 and 3.

EXAMPLE VI

The method of Example I is repeated except that 1.05 gms. of dark green petrolatum is extracted, and the fluorescent fraction is recovered therefrom.

It is evident from the above examples that the number of extraction steps is variable, the only requirement being that at least one extraction step with a chloroform containing solution is necessary to recover the fluorescent fraction. Likewise, the extracting solvents, may be petroleum ether, chloroform and mixtures thereof. However, in order to recover the fluorescent fraction it is necessary to extract with a chloroform containing solution, which may be the total content of the extracting liquid, or 10% to 50% of a mixture with petroleum ether. The fluorescent portion recovered by column chromatography represents less than half of the naturally pigmented petrolatum (about 20% of the red vet petrolatum) and is tentatively believed to be a dis-substituted ortho phenyl ether derivative. Small amounts of a hydroxyl compound is also present. It is this fluorescent fraction that renders said pigmented petrolatums effective as sunscreening agents, as evidenced by irradiation tests using (1) snow white petrolatum, (2) a fraction of red vet petrolatum that does not fluoresce, and (3) clear white petrolatum plus 20% fluorescent fraction. Each of the above compositions was applied in a thin layer to separate areas of the back of an adult male and irradiated with an ultraviolet lamp for 1, 2, 3, 4 and 5 minutes. Results observed 18 hours after treatment showed no difference in the severity of erythema between the white petrolatum, the non-fluorescent fraction and the control. The fluorescent fraction containing composition, however, shows 100% protection. It has further been found that even after standing under a shower prior to irradiation, the area coated with the composition containing the fluorescent fraction exhibits 100% protection against sunburn. This eliminates the necessity of reapplying said sunscreening composition after swimming.

The active sunscreen agent recovered from naturally pigmented petrolatum may be incorporated into any suitable cosmetic or pharmaceutical vehicle to impart superior protection against undesirable effects of ultraviolet rays. This includes formulations in oil base compositions, emulsions of either water-in-oil or oil-in-water, alcoholic solutions, hydroalcoholic solutions and aerosol products. The sunscreening compositions of the instant invention may be in the form of lotions, creams, or ointments. In addition, these compositions may be packaged in aerosol cans, glass and plastic containers of all sizes and shapes. An essential advantage of the use of the fluorescent fraction as the sunscreen agent is the ease with which it can be formulated into cosmetically acceptable non-greasy vehicles, whereas the naturally pigmented petrolatums are greasy and tend to fell uncomfortable to the touch.

The following examples are further illustrative of the formulations of the present invention, and it is to be understood that the invention is not limited thereto.

EXAMPLE 1

| Ingredient | Weight, mg. | Percent |
|---|---|---|
| Fluorescent fraction | 41 | 20 |
| Snow white petrolatum | 162 | 80 |

The petrolatum and the fluorescent fraction are blended well by continuous agitation at slightly elevated temperature. The resultant product is a homogeneous, smooth ointment having superior sunscreening properties inclusive of high absorption of ultraviolet rays, continuous and tenacious film formation on the skin.

EXAMPLE 2

To the heated ointment of Example 1 was added 12% phenyl salicylate. This product also exhibited 100% effectiveness against ultraviolet rays and possessed all the attributes of the ointment in Example I.

EXAMPLE 3

| Ingredients: | Percent |
|---|---|
| Mono and diglyceride of fat forming acids | 2 |
| Sorbitol solution | 18 |
| Fluorescent fraction | 5 |
| White petrolatum | 19 |
| Water | 56 |

A thick slurry is formed by adding sorbitol in small increments to the glyceride and agitating vigorously. The fluorescent fraction and the petrolatum are added to said slurry and the mixture is heated to 70° C. The water is added thereto at said elevated temperature and vigorously agitated. The resultant water-in-oil cream formulation is milled to effect maximum smoothness and stability. This product was applied to the back of an adult male and subsequently subjected to irradiation with a Burdick sunlamp for periods of 30 seconds, 1 minute, 2 minutes, and three minutes. After 18 hours, observations showed that there was no erythema on any of the treated areas, whereas the adjacent non-treated area exhibited severe erythema upon exposures of three minutes. The tests were repeated on subjects who allowed cool water to run over the treated area prior to irradiation. The results of these tests also exhibited 100% effectiveness against the deleterious ultraviolet rays, further proving the tenacity and durability of the film deposited on the skin.

EXAMPLE 4

A cream was prepared in accordance with Example 3, except that the fluorescent fraction and the petrolatum were increased to 7% and 28% respectively and the water content reduced to 45%. This product exhibited superior protection against prolonged periods of exposure to ultraviolet rays than the product of Example 3 due to the greater percent of fluorescent fraction present in this formulation.

EXAMPLES 5 AND 6

Sesame oil which possess ultraviolet ray absorbing properties is added to Examples 3 and 4 to improve the spreadability of the cream, yield a more smooth product and enhance protection against irradiation.

Minor amounts of additives may also be included in the instant sunscreen compositions such as thickening or bodying agents, perfumes, colorants, preservatives, therapeutic and bactericidal agents, surfactants, etc. in order to effect a specific desired result i.e. perfumed ointment.

Although the present invention has been described and illustrated with a reference to specific examples, it is understood that modifications and variations of composition and procedure are contemplated within the scope of the appended claims.

What is claimed is:

1. A stable sunscreening composition containing a cosmetic vehicle having dispersed therein from about 5% to about 20% of a fluorescent concentrate comprising the evaporation residue of a chloroform extract of the yellow band formed during chromatography of a naturally pigmented petrolatum in a petroleum ether solvent, said residue being isolated from a chromatographic column packed with a slurry of alumina and petroleum ether, the isolation comprising dissolving naturally pigmented petrolatum in petroleum ether to form a solution, adding said solution to said chromatographic column, washing with petroleum ether to remove the non-fluorescent portions of the petrolatum, then washing with a member selected from the group consisting of chloroform and 9:1 to 1:1 mixtures of petroleum ether and chloroform, collecting the fluorescent portion represented by the yellow band area at the bottom of the column, and evaporating the fluorescent portion to form said fluorescent concentrate.

2. The stable sunscreening composition of claim 1 wherein the fluorescent concentrate is separated out from dark green petrolatum.

3. The stable sunscreening composition of claim 1 wherein the fluorescent concentrate is sepaarted out from red veterinary petrolatum.

References Cited

UNITED STATES PATENTS 2,267,200  12/1941  Hersberger _____ 167—90

OTHER REFERENCES

Sachanen, The Chem. Constituents of Petroleum, Reinhold Pub., New York, 1945, pp. 40, 41, 123, 284–287, 392–394, 396–399, 404–406.

Strain, Chromatographic Adsorp. Analy., Interscience Pub., New York, vol. 2, 1945, pp. 1–4, 53, 54, 61.

Klemoard, Lubricating Greases: Their Mfg. and Use, Reinhold Pub., New York, 1937, p. 39.

Van Nes, Aspects of The Constitution of Mineral Oils, Elsevier, Pub., New York, 1951, pp. 145, 146.

MacEachern, Arch. of Derm., vol. 89, January 1964, pp. 147–150.

ALBERT T. MEYERS, Primary Examiner

ANNA P. FAGELSON, Assistant Examiner

U.S. Cl. X.R.

208—310; 424—60